(12) United States Patent
Palanisamy et al.

(10) Patent No.: US 11,520,573 B2
(45) Date of Patent: Dec. 6, 2022

(54) GUIDED APPLICATION ROLLBACK AND MIGRATION

(71) Applicant: VMWARE, INC., Palo Alto, CA (US)

(72) Inventors: Karthikeyan Palanisamy, Bangalore (IN); Ramanandan Nambannor Kunnath, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/001,669

(22) Filed: Aug. 24, 2020

(65) Prior Publication Data

US 2022/0012037 A1     Jan. 13, 2022

(30) Foreign Application Priority Data

Jul. 8, 2020   (IN) .............................. 202041029088

(51) Int. Cl.
*G06F 8/65* (2018.01)
*G06F 3/06* (2006.01)
(Continued)

(52) U.S. Cl.
CPC .............. *G06F 8/65* (2013.01); *G06F 3/0619* (2013.01); *G06F 3/0647* (2013.01);
(Continued)

(58) Field of Classification Search
CPC ........ G06F 8/65; G06F 3/0619; G06F 3/0647; G06F 3/0673; G06F 8/62; G06F 8/71
(Continued)

(56) References Cited

U.S. PATENT DOCUMENTS

2006/0225028 A1* 10/2006 Lau .................. G06Q 10/10
                                                          717/102
2011/0265077 A1* 10/2011 Collison ............... G06F 8/60
                                                          717/172
(Continued)

FOREIGN PATENT DOCUMENTS

CN         107241370 A    * 10/2017

OTHER PUBLICATIONS

Losada et al, "Local rollback for resilient MPI applications with application-level checkpointing and message logging", 2019, [Online], pp. 450-464, [Retrieved from internet on Aug. 6, 2022], <https://www.sciencedirect.com/science/article/pii/S0167739X18303443> (Year: 2019).*

*Primary Examiner* — S. Sough
*Assistant Examiner* — Zengpu Wei
(74) *Attorney, Agent, or Firm* — Clayton, McKay & Bailey, PC (57) ABSTRACT

Examples described herein include systems and methods for improved application rollback or application migration on a user device. A portal application can store state information for multiple applications installed on a user device. The portal application can send the state information to a management server that exerts management control over aspects of the user device. The management server can send a rollback command to the portal application, instructing the portal application to rollback a target application that is already installed on the device. The portal application can cause the application to be uninstalled and can install a new instance of the target application as specified by the rollback command. The example method can further include the portal application providing at least some state information to the new instance of the application. The new instance of
(Continued)

the application can use that state information to implement a configuration in the application.

20 Claims, 6 Drawing Sheets

(51) Int. Cl.
*G06F 8/71* (2018.01)
*G06F 8/61* (2018.01)

(52) U.S. Cl.
CPC .............. *G06F 3/0673* (2013.01); *G06F 8/62* (2013.01); *G06F 8/71* (2013.01)

(58) Field of Classification Search
USPC .......................................................... 717/170
See application file for complete search history.

(56) References Cited

U.S. PATENT DOCUMENTS

| | | | |
|---|---|---|---|
| 2015/0370428 A1* | 12/2015 | Chan ................... | G06F 3/04842 715/739 |
| 2016/0026452 A1* | 1/2016 | Dani ......................... | G06F 8/65 717/170 |
| 2016/0063131 A1* | 3/2016 | Kuscher .................. | H04L 67/02 715/234 |
| 2016/0087956 A1* | 3/2016 | Maheshwari ......... | H04L 63/083 726/6 |
| 2018/0067811 A1* | 3/2018 | Mowatt .................. | G06F 11/142 |
| 2018/0349134 A1* | 12/2018 | Studer ........................ | G06F 8/71 |
| 2019/0294796 A1* | 9/2019 | Elango ....................... | G06F 8/70 |
| 2020/0293354 A1* | 9/2020 | Song ..................... | G06F 11/1438 |
| 2020/0403785 A1* | 12/2020 | Boivin .................. | H04L 9/0822 |
| 2021/0004274 A1* | 1/2021 | Damm ..................... | G06F 3/0652 |
| 2021/0240522 A1* | 8/2021 | Ranjan .................. | G06F 3/0665 |

\* cited by examiner

GUIDED APPLICATION ROLLBACK AND MIGRATION

RELATED APPLICATIONS

Benefit is claimed under 35 U.S.C. 119(a)-(d) to Foreign Application Serial No. 202041029088 filed in India entitled "GUIDED APPLICATION ROLLBACK AND MIGRATION", on Jul. 8, 2020, by VMware, Inc., which is herein incorporated in its entirety by reference for all purposes.

BACKGROUND

In an enterprise environment, employees commonly use applications to perform various work tasks. These applications can be managed by the enterprise, allowing the enterprise to control which applications are installed on a user's device as well as the versions of the applications allowed on the device. In some examples, managed applications can consume a shared software development kit ("SDK"), allowing those applications to securely communicate with one another and with one or more servers.

Applications can become corrupted over time for a variety of reasons. For example, an update to an application can be halted because of a critical release issue. If the application was updating at that time, the update can freeze and break the application. When an application becomes corrupted for some reason, the application can be rendered unusable. In some cases, there is no way to roll back the application to a previous state. This negatively affects a user's productivity and requires manual intervention from an IT professional, translating to added costs for the enterprise.

Application states also play a role in application migration, such as when a secure container is added to a device and the managed applications on the device are required to be moved into that container. Doing so typically involves downloading a new instance of each application and uninstalling the old instances, but the process is not seamless. The new instances may still require manual setting up, such as by entering credentials or establishing preferences that were already established in the old instance of the application.

As a result, a need exists for systems and methods for preserving application states and applying the preserved states to rollback or migrate an application as needed.

SUMMARY

Examples described herein include systems and methods for improved application rollback or application migration on a user device. In one example, a portal application stores state information for multiple applications installed on a user device. The portal application can be an application executing on the device and providing access to multiple other applications, such as by using single sign on ("SSO") to provide access to a catalogue of applications. The portal application can send the state information to a management server that exerts management control over aspects of the user device. In some examples, the portal application includes a built-in management agent that carries out functions prescribed by the management server.

The state information can include relevant information such as an application version, an application data hash, a last backup time, a health status report, a health status report hash, and a read/write location for the application. The health status report can be customized based on the type of application, but in some examples can include an indication that the application is syncing properly, an indication of network connectivity of the application, a crash report for the application, error loggings, and an indication of whether the application can receive notifications.

The example method can include the management server sending a rollback command to the portal application, instructing the portal application to rollback a target application that is already installed on the device. The portal application can cause the application to be uninstalled and can install a new instance of the target application as specified by the rollback command. The new instance of the target application can be different from the old instance, such as by having a different version number. In some examples, the new instance of the target application is the same version as the old instance but is intended to replace a corrupted application.

The example method can further include the portal application providing at least some state information to the new instance of the application. The new instance of the application can use that state information to implement a configuration in the application.

In some examples, the rollback command is an instruction to migrate one or more applications from outside a secure container to inside the secure container. In that example, the portal application can save the state information, including state information for the portal application itself, to a storage location of the user device. The portal application can then cause a secure container, such as a secure work profile, to be created on the device. It can install a new instance of the portal application inside the container. Then, it can retrieve state information pertaining to the portal application and apply it to the new instance of the portal application. The new instance of the portal application can install new instances of the remaining applications within the secure container and apply relevant state information to each one.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for improved application rollback or application migration on a user device. In one example, a portal application stores state information for multiple applications installed on a user device. The portal application can send the state information to a management server that exerts management control over aspects of the user device. The example method can include the management server sending a rollback command to the portal application, instructing the portal application to rollback a target application that is already installed on the device. The portal application can cause the application to be uninstalled and can install a new instance of the target application as specified by the rollback command. The example method can further include the portal application providing at least some state information to the new instance of the application. The new instance of the application can use that state information to implement a configuration in the application.

In some examples, the rollback command is an instruction to migrate one or more applications from outside a secure container to inside the secure container. In that example, the portal application can save the state information, including state information for the portal application itself, to a storage location of the user device. The portal application can then cause a secure container, such as a secure work profile, to be created on the device. It can install a new instance of the portal application inside the container. Then, it can retrieve state information pertaining to the portal application and apply it to the new instance of the portal application. The new instance of the portal application can install new instances of the remaining applications within the secure container and apply relevant state information to each one.

Figure 1:
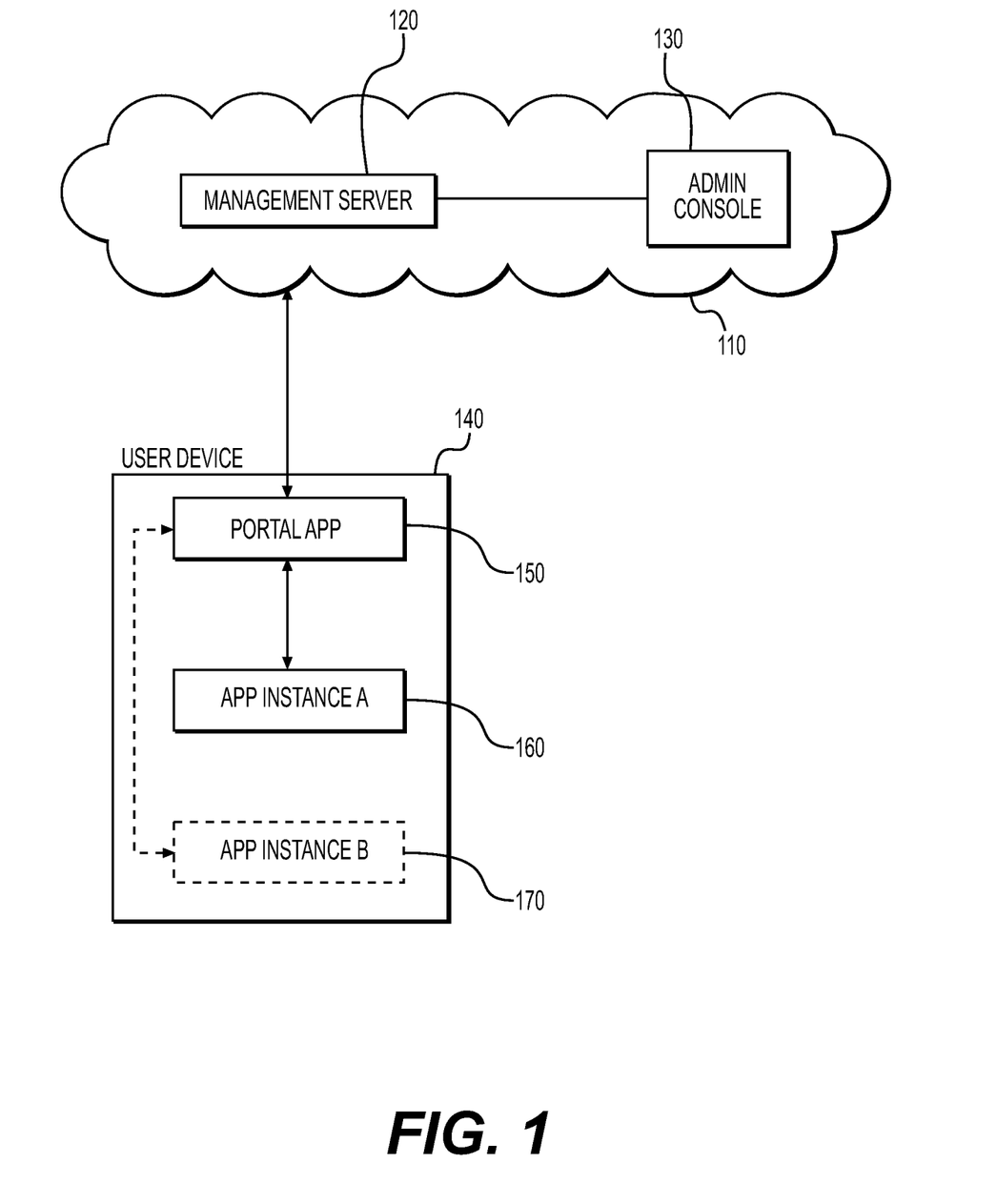
FIG. 1 is an illustration of an example system for performing application rollback.

FIG. 1 provides an illustration of an example system for performing application rollback. The system can include a user device 140 and a managed cloud 110 that includes a management server 120 and an administrator console 130. The user device 140 can be any processor-enabled device, such as a laptop, tablet, or phone. The user device 140 can include a non-transitory, computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others. In one example, the user device 140 can be a personal user device that is owned by the user rather than an enterprise. The user device 140 can also be a corporate or enterprise-owned device.

The management server 120 can manage the user device 140 and other user devices in a workplace or other enterprise environment. The management server 120 can be a network of servers, some of which can be located remotely from one another. In another example, the management server 120 is a single server with multiple purposes. In yet another example, the management server 120 can be one or more servers dedicated to the operations described herein. In order to manage the user device 140, the management server 120 can allow the user device to complete an enrollment process with the management server 120.

After the user device 140 has enrolled, the management server 120 can initiate installation of one or more managed applications on the user device 140. The managed applications can access enterprise information based on permissions stored at the management server 120. To maintain security of enterprise information, the management server 120 can control aspects of at least one managed application used to carry out enterprise activities.

A system administrator can have privileges associated with managing, editing, revising, and otherwise administrating functions associated with the management server 120. The management server 120 can monitor and manage the operation of user devices 140, through the management server 120 itself, or more specifically, through a management service or program executing on the management server 120. Although one user device 140 is shown, the management server 120 can monitor and manage the operation of multiple user devices 140 enrolled in a device management service, such as a unified endpoint management ("UEM") system. The management server 120 can also provide access to email, calendar data, contact information, and other enterprise resources to enrolled user devices 140.

A system administrator can interact with the management server 120 through the administrator console 130. The administrator console 130 can be a user interface accessible to the administrator, such as through a web portal or by using dedicated software. In either case, the console 130 can provide a communication conduit to the management server 120 as well as various options for implementing and customizing the management server 120. A system administrator can provide instructions through the console 130 to perform actions with respect to applications on a user device 140. For example, the instructions can request information from the applications, cause updating or deletion of application, or cause migration of applications from one location to another. The administrator console 130 allows such instructions to be communicated to a large group of user devices 140 at the same time.

In the example of FIG. 1, the user device 140 can include a portal application 150. The portal application 150 can be, as an example, an application that provides varying levels of access to multiple other applications that may or may not be installed on the user device 140. The portal application 150 can store a user's credentials and provide access to enterprise applications by authenticating the user to various applications. For example, the portal application 150 can utilize SSO services to provide access to applications. The applications can be native applications installed on the user device 140 or web-based applications that are accessed through a web portal on the user device 140.

The portal application 150 can include a management component that can assist in the enrollment process by communicating with the management server 120—such as by exchanging tokens—eliminating the need to download a management-dedicated application such as an agent application. After enrolling the user device 140 with the management server 120 through the portal application 150, the management server 120 can provide the portal application 150 with an authorization certificate or token ("authorization certificate"). In some examples, when portal application 150 requests access to enterprise resources from management server 120, portal application 150 can provide the authorization certificate, which verifies that the user device 140 is authorized to access the enterprise resources.

In an example where the portal application 150 includes a management component, the portal application 150 can cause the user device 140 to take various actions based on rules set by the management server 120. For example, the portal application 150 can enforce compliance rules that establish a remedial action to be taken in response to the presence of a triggering condition. In an example, the triggering condition is determining that the user device 140 has a malicious application installed on it. In that example, the remedial action can be deleting the malicious application, locking the user device 140, wiping the user device 140, or alerting an administrator.

The portal application 150 can also manage the installation, updating, and rolling back of applications on the user device 140. As shown in FIG. 1, for example, the user device can include Application Instance A 160, which can be any type of application managed through the portal application 150. For example, Application Instance A 160 can be an email application, content application, word processing application, or any other type of application.

Figure 2:
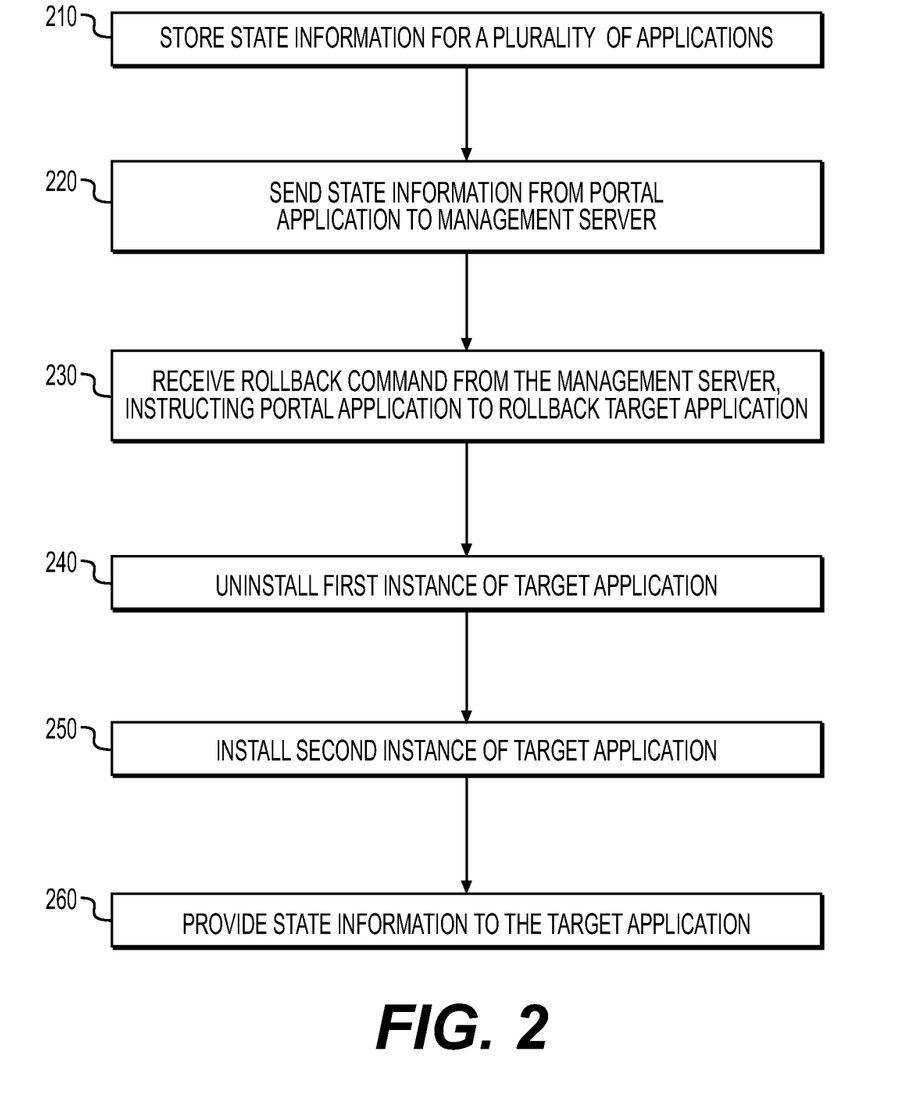
FIG. 2 is a flowchart of an example method for performing application rollback
Figure 3:
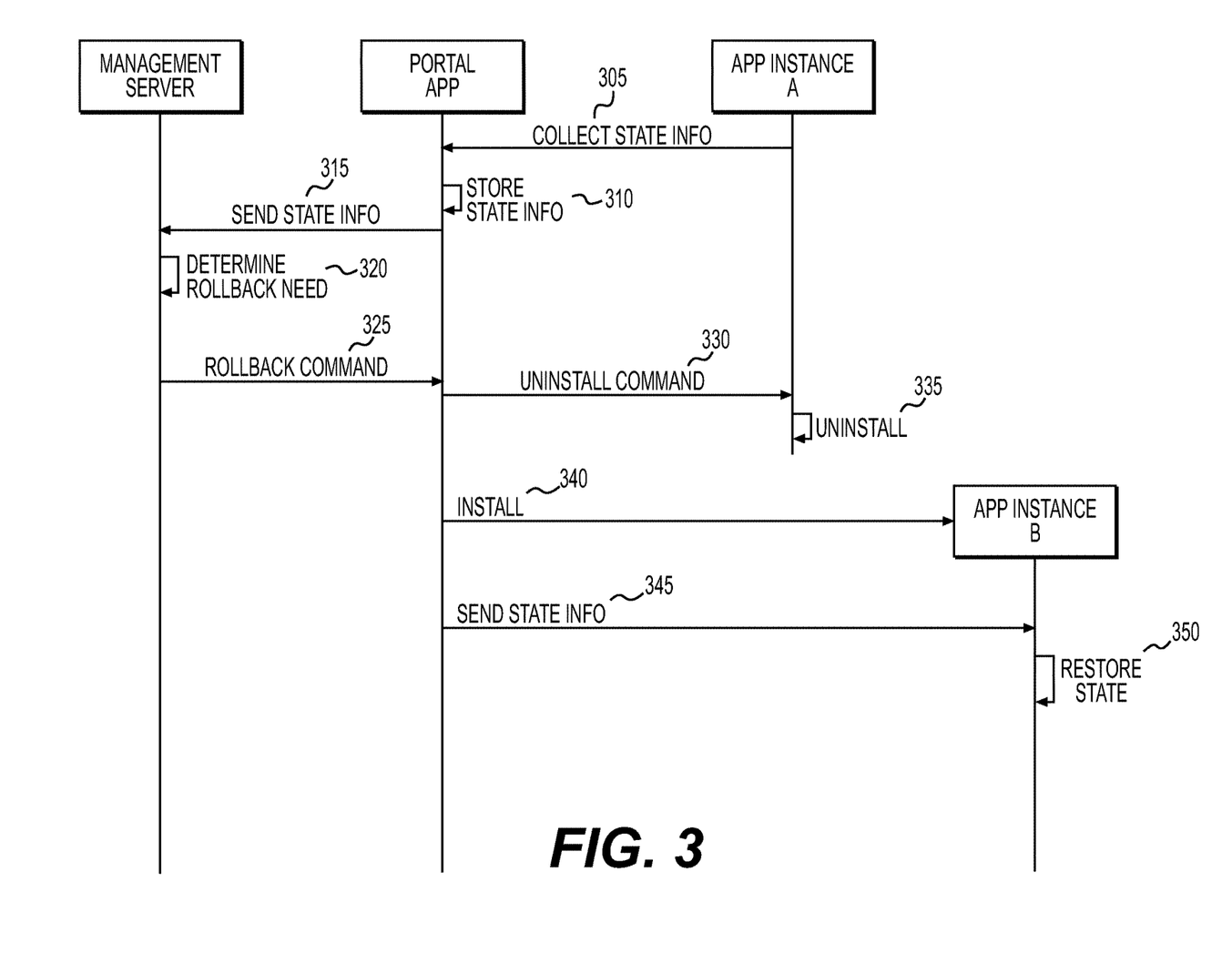
FIG. 3 is a sequence diagram of an example method for performing application rollback.

As explained in more detail with respect to FIGS. 2 and 3, the portal application 150 can receive a rollback instruction from the management server 120, with the instructions identifying Application Instance A 160 and instructing the portal application 150 to rollback that application 160 to an earlier version. In response, the portal application 150 can install Application Instance B 170, which can be a different instance of the same application as Application Instance A 160. It can also uninstall Application Instance A 160.

The portal application 150 can then provide saved state information to Application Instance B 170 and configure that instance 170 of the application to match the previous instance 160 of the application. This allows a seamless transition for a user while solving problems with the previous instance 160, such as a corrupted state or broken code due to a faulty update.

FIG. 2 provides an example flowchart of a method for performing such a rollback procedure, using a system such as the system of FIG. 1. Stage 210 of the method can include storing state information for a plurality of applications. State information can include any information regarding an application. For example, the state information can include relevant information such as an application version, an application data hash, a last backup time, a health status report, a health status report hash, and a read/write location on the user device 140 for the application.

The health status report can include an indication that the application is syncing properly, an indication of network connectivity of the application, a crash report for the application, error loggings, and an indication of whether the application can receive notifications. The health status report can be customized based on the type of application at issue. For an email application, for example, the health status report can include an indication of the most recent email synchronization. In some examples, the health status report is compiled by an SDK upon which the application is built. In some examples, the portal application 150 and other managed applications 160, 170 can share the same base SDK and thereby compile similar health status reports for each application.

The portal application 150 can send the state information to the management server at stage 220. The transmission of state information can be performed periodically, such as every five or ten minutes. It can also be performed based on changes at the user device 140, such as when an application is installed, updated, or otherwise changed.

At stage 230, the portal application 150 can receive a rollback command from the management server 120. The rollback command can be initiated for various reasons. In one example, the rollback command is manually provided by a system administrator, using the administrator console 130. For example, the administrator can determine that a previous version of an application has fewer bugs than a more recent version, or that the more recent version is not compliant with other applications or services on the device 140. In those examples, the administrator can provide an instruction to the management server 120 through the console 130, such as by selecting a rollback option and specifying a rollback version for one or more applications. The management server 120 can receive the instruction, format it for consumption by the portal application 150, and then provide the rollback command to the portal application 150.

In some examples, the management server 120 automatically determines that a rollback command should be sent at stage 230. The determination can be based on the state information received at stage 220. For example, the state information can indicate that an email application has stopped performing email synchronization. The management server 120 can determine whether any changes to the email application have occurred recently that may have caused the problem. For example, the email application may have updated to a new version around the same time that the synchronization stopped. The management server 120 can compare the timing of the update and failed synchronizations to a threshold to determine a likely cause of the issue. In that example, the management server 120 can automatically generate an instruction for the portal application 150 to roll back the email application to the previous version. The instruction can include information regarding the previous state, such as the previous application version, based on previous state information saved at the management server 120.

In some examples, the management server 120 determines that a rollback command should be sent based on an analysis of one or more health status reports provided by the portal application 150. In one example, the management server 120 determines that a health status report for an application includes an excessive number of errors in an error log, such that the number of errors surpasses an acceptable threshold. In another example, the management server 120 determines that the health status report indicates an excessive number of crashes in a crash report, again surpassing an acceptable threshold. In another example, the management server 120 determines that the health status report indicates a lack of network connectivity of an application. Similarly, any other information in the health status report or otherwise in the state information for an application can be considered by the management server 120 in deciding to issue the rollback command.

In some examples, the state information can include an overall summary of an application's state or health, such an indication that the application is considered either low risk, medium risk, or high risk. The management server 120 can also compare an application's state on one user device 140 to the same application's states on multiple other user devices 140. When a certain percentage of users experience a change in the state of a particular application, the management server 120 can automatically determine that a rollback should be performed.

In some examples, the determination can be made by the portal application 150 rather than by the management server 120. To accomplish this, the management server 120 can send a profile to the portal application 150 that includes various rules to be applied for determining when to roll back an application. This delegation can allow the portal application 150 to make a rollback decision on behalf of the management server 120, such as in examples where the user device 140 has no connection to the management server 120.

At stage 240, the portal application 150 can uninstall a first instance 160 of an application installed on the user device 140, as instructed by the rollback command at stage 230. The portal application 150 can utilize a built-in management component to cause the user device 140 to uninstall the application. At stage 250, the portal application 150 can install a second instance 170 of the same application. The second instance 170 can be different from the first instance 160, such as by being a different version. In one example, the different version is the most recent version that was operable prior to the current version. In an example where the first instance 160 has become corrupted, the second instance 170 can be different from the first 160 by virtue of being a clean installation. Stages 240 and 250 can happen in any order or simultaneously.

At stage 260, the portal application 150 can provide state information to the new instance 170 of the application installed on the user device 140. In some examples, this stage includes requesting and receiving the state information from the management server 120. In other examples, the state information is provided by the management server 120 at stage 230, along with the rollback command. For example, the rollback command can include specific state information to apply to the new instance 170 of the application. In yet other examples, the portal application 150 applies state information saved at the user device 140. In those examples, the rollback command from the management server 120 can include an indication of which saved state information to apply, such as by identifying a date and time at which the desired state information was saved.

The state information can be transmitted between applications using a secure communication functionality built into the SDK's shared by both applications. The new instance 170 of the application can apply the state information, allowing the user to access the application without disruption or additional steps required from the user.

FIG. 3 provides a sequence diagram of an example method for performing application rollback. At stage 305, the portal application 150 collects state information from a first instance 160 of an application, also referred to as Application Instance A. The state information can be collected through the SDK shared between the portal application 150 and the first instance 160. For example, the SDK can establish a secure communication channel between applications. The secure channel can allow for requests to be sent from one application to another, and for responsive information to be returned accordingly. For example, the portal application 150 can request the state information from the first instance 160 of the application through the SDK communication channel, and the application can provide the requested information through the same SDK channel. Stage 305 can include collecting state information for multiple applications on the user device 140, including any applications managed by the management server 120.

At stage 310, the portal application 150 can store the state information received at stage 305. This can include aggregating or formatting the state information, such as by creating a table with a different row or column for each application. The aggregated state information can be sent to the management server 120 at stage 315.

At stage 320, the management server 120 can determine that a rollback is needed for one or more applications. As explained with respect to FIG. 2, this determination can be made in a variety of ways. In one example, the rollback command is manually provided by a system administrator, using the administrator console 130. For example, the administrator can determine that a previous version of an application has fewer bugs than a more recent version, or that the more recent version is not compliant with other applications or services on the device 140. In those examples, the administrator can provide an instruction to the management server 120 through the console 130, such as by selecting a rollback option and specifying a rollback version for one or more applications. The management server 120 can receive the instruction, format it for consumption by the portal application 150, and then provide the rollback command to the portal application 150.

In some examples, the management server 120 automatically determines that a rollback command should be sent at stage 230. The determination can be based on the state information received at stage 220. For example, the state information can indicate that an email application has stopped performing email synchronization. The management server 120 can determine whether any changes to the email application have occurred recently that may have caused the problem. For example, the email application may have updated to a new version around the same time that the synchronization stopped. The management server 120 can compare the timing of the update and failed synchronizations to a threshold to determine a likely cause of the issue. In that example, the management server 120 can automatically generate an instruction for the portal application 150 to roll back the email application to the previous version. The instruction can include information regarding the previous state, such as the previous application version, based on previous state information saved at the management server 120.

In some examples, the management server 120 determines that a rollback command should be sent based on an analysis of one or more health status reports provided by the portal application 150. In one example, the management server 120 determines that a health status report for an application includes an excessive number of errors in an error log, such that the number of errors surpasses an acceptable threshold. In another example, the management server 120 determines that the health status report indicates an excessive number of crashes in a crash report, again surpassing an acceptable threshold. In another example, the management server 120 determines that the health status report indicates a lack of network connectivity of an application. Similarly, any other information in the health status report or otherwise in the state information for an application can be considered by the management server 120 in deciding to issue the rollback command.

In some examples, the state information can include an overall summary of an application's state or health, such an indication that the application is considered either low risk, medium risk, or high risk. The management server 120 can also compare an application's state on one user device 140 to the same application's states on multiple other user devices 140. When a certain percentage of users experience a change in the state of a particular application, the management server 120 can automatically determine that a rollback should be performed. The rollback command can be sent from the management server 120 to the portal application 150 at stage 325.

At stage 330, the portal application 150 can generate an uninstall command that instructs the user device 140 to uninstall a first instance 160 of a particular application. While the command can be provided to the first instance 160 itself, as shown in FIG. 3, it can also be provided to the operating system of the user device 140. The operating system can then take the necessary steps to uninstall the first instance 160 of the application at stage 335.

At stage 340, the portal application 150 can generate an install command for installing a second instance 170 of the same application, referred to in FIG. 3 as Application Instance B. As with the command at stage 330, this command can be provided to the operating system. The command can instruct the operating system to download a new instance 170 of the application from an application repository such as GOOGLE PLAY, or from an application provisioning server managed by the management server 120.

At stage 345, the portal application 150 can send state information to the new instance 170 of the application. In some examples, this stage includes requesting and receiving the state information from the management server 120. In other examples, the state information is provided by the management server 120 at stage 325, along with the rollback command. For example, the rollback command can include specific state information to apply to the new instance 170 of the application. In yet other examples, the portal application 150 applies state information saved at the user device 140. In those examples, the rollback command from the management server 120 can include an indication of which saved state information to apply, such as by identifying a date and time at which the desired state information was saved or by identifying a particular file, table, or column or row of a table.

At stage 350, the second instance 170 of the application apply the state information provided at stage 345 to implement one or more configurations. This stage can include, for example, saving credentials for the user, designating a read/write location on the user device 140, storing encryption keys, applying previously configured settings within the application, designating a server for synchronization, storing browsing history or search history, and any other configuration that can apply to the application at issue.

Although FIG. 3 depicts the first instance 160 of the application being uninstalled before installation of the second instance 170 of the application, these steps can be performed in reverse order or simultaneously. In one example, the second instance 170 of the application is installed and configured first but remains hidden from the user until the first instance 160 is uninstalled and removed. This can allow for a seamless experience from the perspective of the user.

Figure 4:
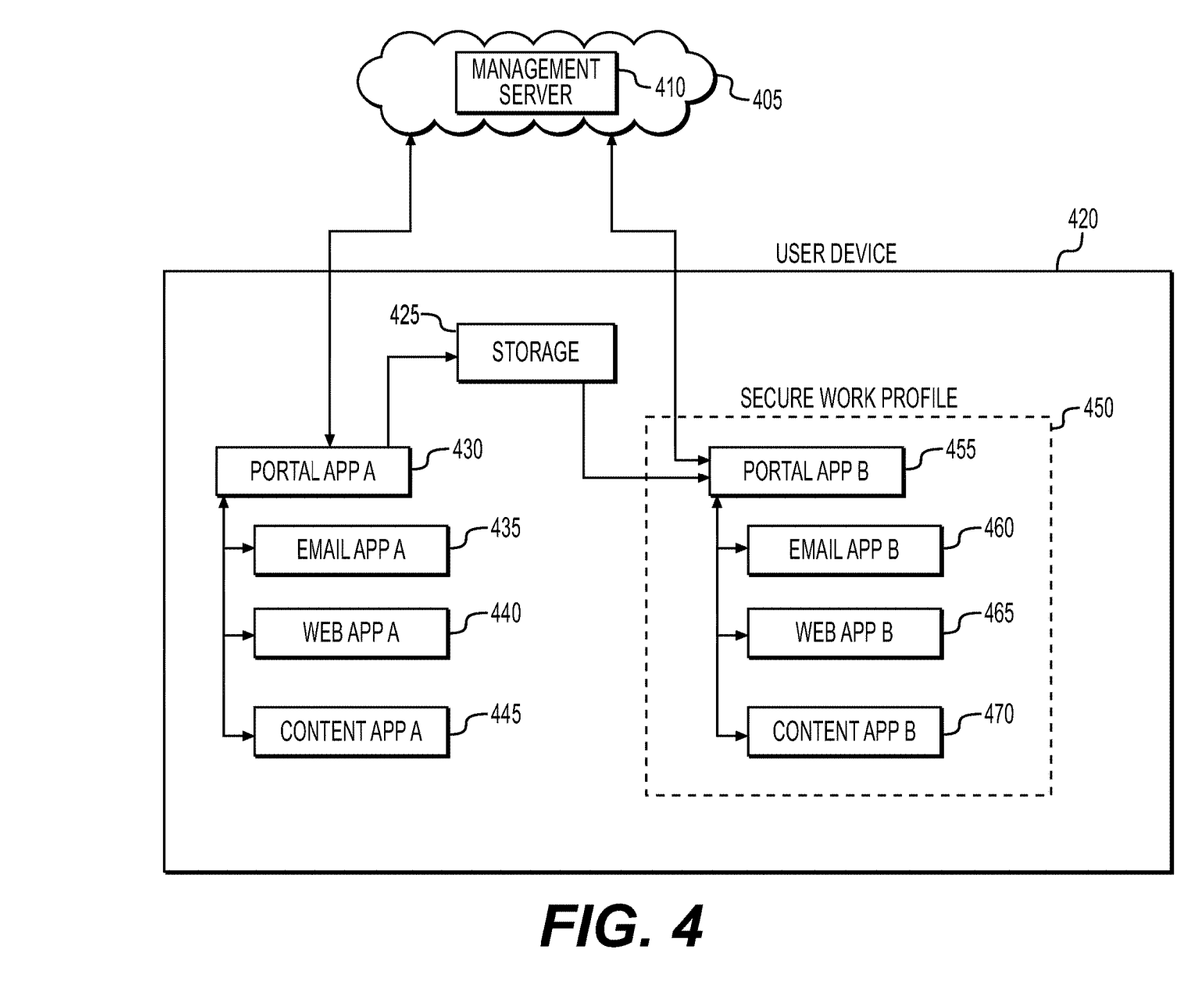
FIG. 4 is an illustration of an example system for performing application migration.

FIG. 4 provides an illustration of an example system for performing application migration. The system of FIG. 4 includes a management server 410 and a cloud 405, which can be similar to the management server 120 and cloud 110 of FIG. 1. Although not shown, the cloud 405 can also include an administrator console similar to the one described with respect to FIG. 1. The system can also include a user device 420, which can include functionality similar to that described with respect to the user device 140 of FIG. 1.

In this example, the user device 420 includes portal application A 430, with the "A" denoting a first instance of that application. The functionality of portal application A 430 is described above with respect to the portal application 150 of FIG. 1. Similarly, the user device 420 can include an email application A 435, web application A 440, and content application A 445. The arrows and lines depicted in FIG. 4 between portal application A 430 and the remaining "A" applications 435, 440, 445 indicate that portal application A 430 manages those applications 435, 440, 445 in some way. For example, portal application A 430 can provide access to those application 435, 440, 445 such as through a user interface of portal application A 430, including a catalogue that presents icons for launching each respective application 435, 440, 445.

In order to exercise control over these applications 435, 440, 445, portal application A 430 can store various types of information in a storage location 425 of the user device 420. In one example, portal application A 430 can store a user's authentication credentials for each available application 435, 440, 445, such that when a user selects an icon to launch an application 435, 440, 445, portal application A 430 can apply the appropriate credential to log the user in. Additionally, portal application A 430 can receive and store state information for the applications 435, 440, 445. The state information can be stored at the device 420 in the storage location 425 but can additionally be sent to the management server 410 for storage.

In some examples, the management server 410 can instruct the user device 420 to establish a secure container, such as a secure work profile 450. In some examples, the management server 410 can provide a profile that includes instructions for creating the secure work profile 450, such as by instructing the user device 420 to create the secure work profile 450 and migrate one or more applications into the secure work profile 450.

The secure container 450 can be a work profile, such as a work profile for use with an ANDROID ENTERPRISE solution. The container 450 can separate work applications and data from personal applications and data on a user device. In some examples, applications installed in the container 450 can be marked with a work badge, such as a briefcase icon, so that they are distinguished from personal application. Similarly, notifications regarding applications in the container 450 can be marked with a work badge to distinguish those notifications from notifications pertaining to a personal application.

The user device 420 can create the secure work profile 450, save state information for all of the "A" applications 430, 435, 440, 445 in the storage location 425, and then install new "B" instances of those same applications inside the secure work profile 450. For example, the user device 420 can download portal application B 455 and configure the application 455 based on state information saved in the storage location 425. Portal application B 455 can receive state information for the remaining applications 435, 440, 445, which it can use to configure new instances 460, 465, 470 of those applications installed within the secure work profile 450.

After the configuration of the new instances 455, 460, 465, 470 is complete, the user device 420 can uninstall the old instances 430, 435, 440, 445 of those applications. The user can therefore seamlessly transition to the more secure applications without any workflow disruption or user intervention. In some examples, the user is not aware that the application instances have changed.

Figure 5:
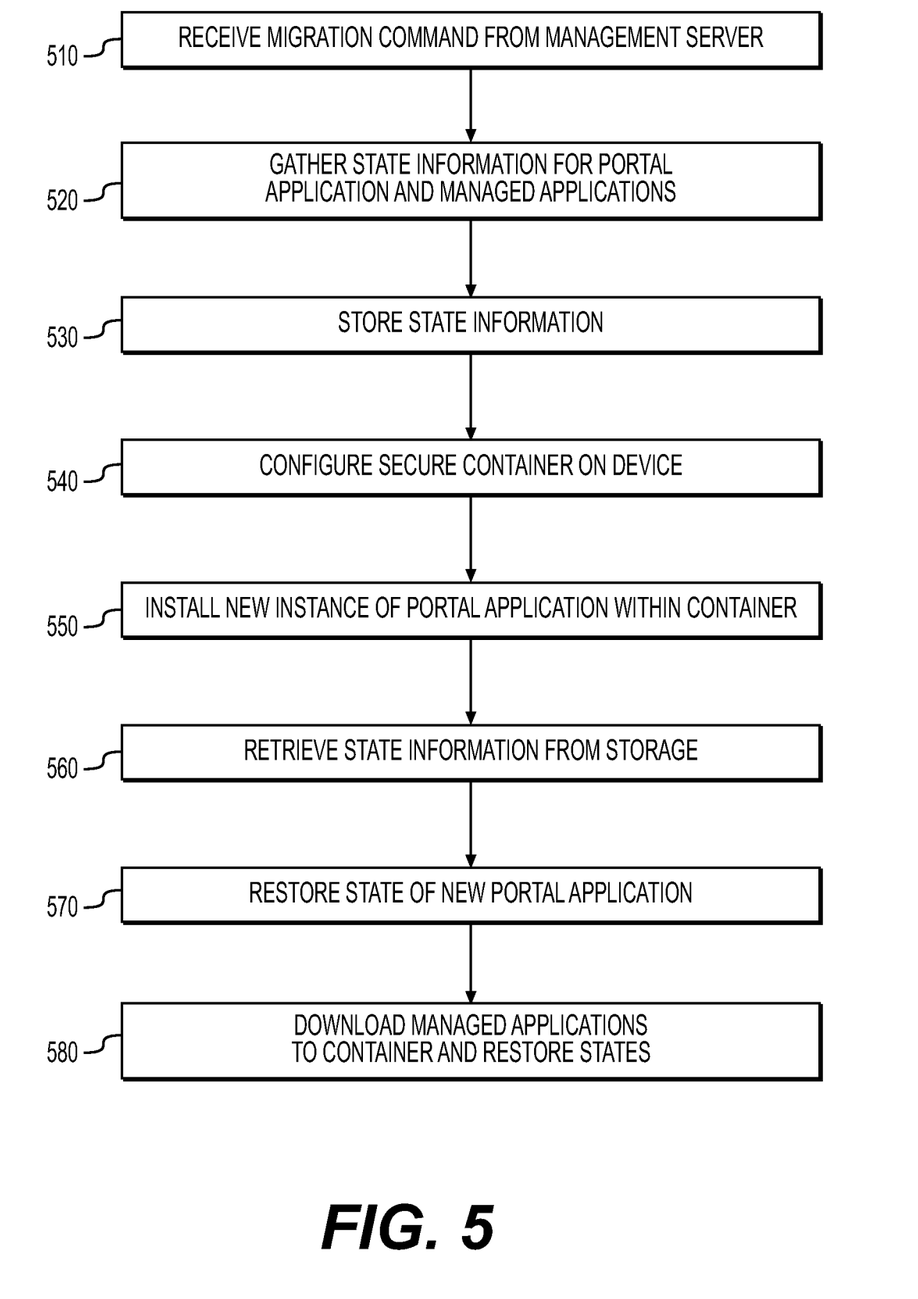
FIG. 5 is a flowchart of an example method for performing application migration.

FIG. 5 provides a flowchart of an example method for performing application migration. At stage 510, the user device 420 can receive a migration command from the management server 410. The migration command can be input to the management server 410 by a system administrator, such as by using an administrator console in communication with the management server 410. The administrator can access the console through a web browser, for example, and select from various options to configure devices as desired. For example, the administrator can select an option that requires managed applications on a selected device to be installed in a secure container. In some examples, the administrator can apply such a selection to a group of devices at the same time. In other examples, the requirement for executing managed applications in a secure container can be applied automatically when a device is enrolled, such as when a device is enrolled in an ANDROID FOR WORK scheme.

The management server 410 can receive the indication that a secure container is required for certain applications or for the device 420 generally, and in response, it can send a migration command to the user device 420. In some examples, this command is sent to portal application A 430, such as by communicating with a management component embedded in portal application A 430.

At stage 520, the user device 420 can gather state information for portal application A 430 and any other managed applications 435, 440, 445 on the user device 420. In some examples, this stage is performed automatically and periodically, such as when the user device 420 is first turned on and at 20-minute intervals thereafter. In some examples, this stage can be performed in response to receiving the migration command at stage 510.

Stage 520 can be performed by portal application A 430. For example, portal application A 430 can request state information from the installed applications 435, 440, 445. In examples where these applications 435, 440, 445 and portal application A 430 share an SDK with a built-in secure communication channel, the request and response can be sent through the secure channel.

State information can include any information regarding an application. For example, the state information can include relevant information such as an application version, an application data hash, a last backup time, a health status report, a health status report hash, and a read/write location on the user device 420 for the application.

The health status report can include an indication that the application is syncing properly, an indication of network connectivity of the application, a crash report for the application, error loggings, and an indication of whether the application can receive notifications. The health status report can be customized based on the type of application at issue. For an email application, for example, the health status report can include an indication of the most recent email synchronization. In some examples, the health status report is compiled by an SDK upon which the application is built. In some examples, the portal application 150 and other managed applications 435, 440, 445 can share the same SDK and thereby compile similar health status reports for each application.

At stage 530, the user device 420 can store the gathered state information at a storage location 425 within the user device 420. This stage can include formatting or aggregating the state information. For example, portal application A 430 can create a single file that contains state information for all managed applications on the device 420. The file can include a table with each row corresponding to a different application and each column corresponding to a different type of information reflecting state information for the respective application. In another example, portal application A 430 can save a separate file having state information for each application. Although FIG. 4 shows that this information is stored at the user device 420, it can also be stored at the management server 410 or at another remote server.

At stage 540, the user device 420 can configure a secure container 450 on the user device 420. The secure container 450 can be a work profile, such as a work profile for use with an ANDROID ENTERPRISE solution. The user device 420 can configure the secure container 450 by implementing one or more instructions received from the management server 410, in one example. The management server 410 can send an instructions file, such as a user profile, which is stored at the user device 420. The user device 420 can then carry out the instructions by establishing a secure container 450. In some examples, portal application A 430 causes the OS of the user device 420 to establish the secure container 450. Applications within the container 450 can be prevented from communicating with other applications outside the container. Applications within the container 450 can also utilize a secure communication channel among other applications within the container 450 or with the management server 410.

At stage 550, the user device 420 can install a new instance of the portal application, such as portal application B 455 in FIG. 4. In some examples, this includes installing a fresh download of the portal application. The new instance 455 can be retrieved from an online application repository, for example. To configure portal application B 455 for use, at stage 560 the user device 420 can retrieve state information for portal application A 430 that was saved at the storage location 425. This information can be provided to portal application B 455 with an instruction to apply the relevant state information.

At stage 570, the user device 420 can restore the state of portal application B 455 to match the state of portal application A 430. Portal application B 455 can be configured, or configure itself, to match the state of portal application A 430, such as by saving user authentication credentials, application credentials, profiles, compliance rules, read/write location, and any other relevant application settings (such as the particular application page that is displayed when the application 455 is launched).

At stage 580, the user device 420 can download managed applications, such as email application B 460, web application B 465, and content application B 470 and restore their states to match the states of the older instances of corresponding email application A 435, web application A 440, and content application A 445. The configuration of these applications 460, 465, 470 can include any changes to the operation, preferences, or settings of each respective application 460, 465, 470. In the example of email application B 460, for example, this can include setting up the application 460 to synchronize with a particular email server, downloading emails to be stored locally, storing a signature to be applied to outgoing emails, setting formatting preferences, and setting any other type of preferences available for email application B 460 that are carried over from email application A 435. Similar configurations can be applied to web application B 465 and content application B 470. These configurations can be applied by portal application B 455, in some examples.

Figure 6:
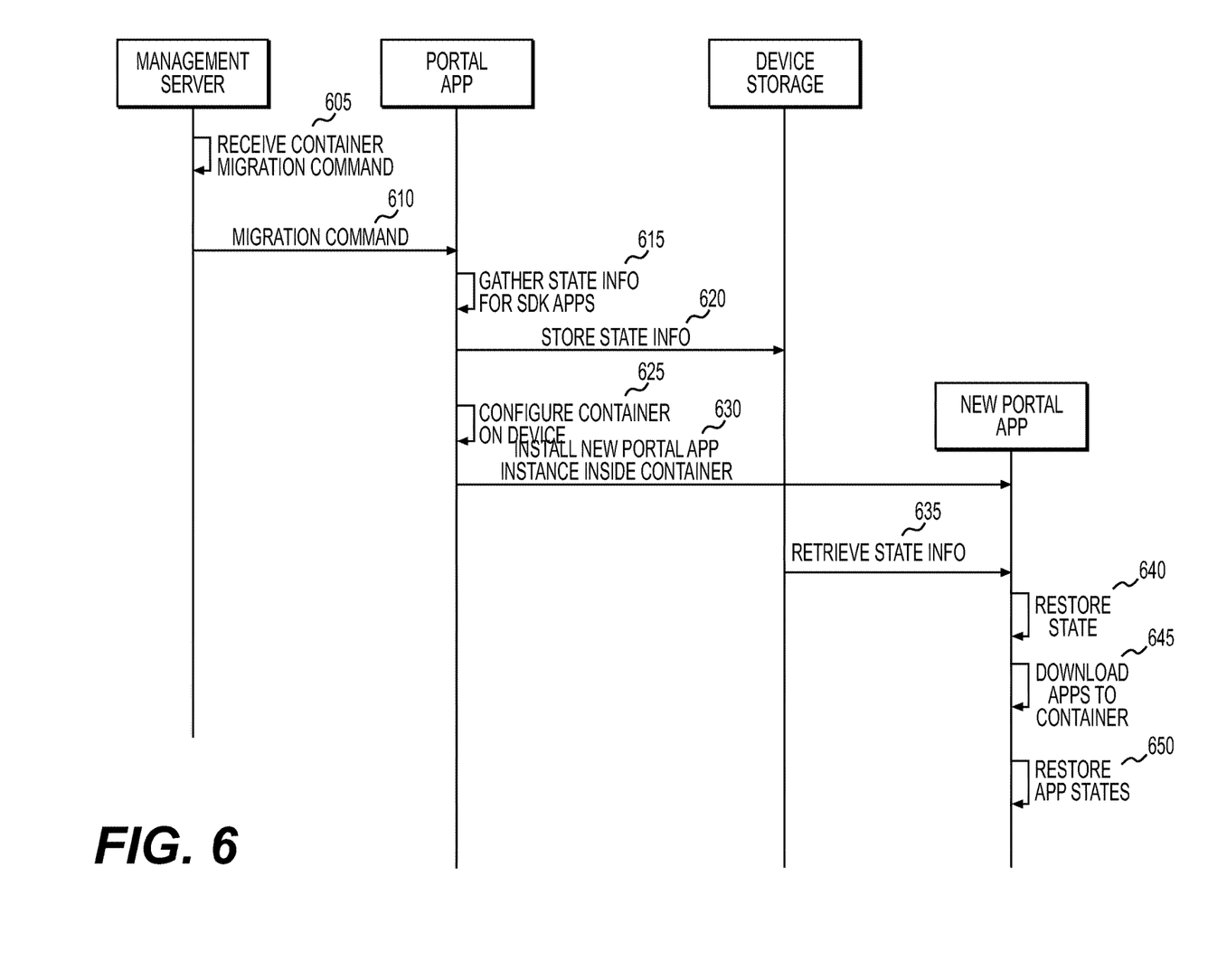
FIG. 6 is a sequence diagram of an example method for performing application migration.

FIG. 6 provides a sequence diagram of an example method for performing application migration using the system of FIG. 4. At stage 605, the management server 410 can receive a container migration command. The migration command can be input to the management server 410 by a system administrator, such as by using an administrator console in communication with the management server 410. The administrator can access the console through a web browser, for example, and select from various options to configure devices as desired. For example, the administrator can select an option that requires managed applications on a selected device to be installed in a secure container. In some examples, the administrator can apply such a selection to a group of devices at the same time. In other examples, the requirement for executing managed applications in a secure container can be applied automatically when a device is enrolled, such as when a device is enrolled in an ANDROID FOR WORK scheme.

The management server 410 can receive the indication that a secure container is required for certain applications or for the device 420 generally, and in response, it can send a migration command to the user device 420 at stage 610. In some examples, such as the example method shown in FIG. 6, this command is sent to portal application A 430. For example, the command can be communicated to a management component embedded in portal application A 430.

At stage 615, the portal application 430 can gather state information for relevant applications 435, 440, 445 on the user device. The migration command received at stage 610 can list any applications that need to be migrated, so at stage 615 the portal application 430 can gather state information for those applications. In some applications, the portal application 430 determines which applications on the user device 420 are managed or otherwise need to be migrated based on the migration command 610. Portal application A 430 can request state information from the installed applications 435, 440, 445. In examples where these applications 435, 440, 445 and the portal application 430 share an SDK with a built-in secure communication channel, the request and response can be sent through the secure channel.

State information can include any information regarding an application. For example, the state information can include relevant information such as an application version, an application data hash, a last backup time, a health status report, a health status report hash, and a read/write location on the user device 420 for the application. The health status report is described in more detail with respect to FIG. 5.

At stage 620, the user device 420 can store the gathered state information at a storage location 425 within the user device 420. This stage can include formatting or aggregating the state information. For example, the portal application 430 can create a single file that contains state information for all managed applications on the device 420. The file can include a table with each row corresponding to a different application and each column corresponding to a different type of information reflecting state information for the respective application. In another example, the portal application 430 can save a separate file having state information for each application.

At stage 625, the portal application 430 can configure a secure container 450 on the user device 420. As explained with respect to FIG. 5, the secure container 450 can be a work profile, such as a work profile for use with an ANDRIOD ENTERPRISE solution. The user device 420 can configure the secure container 450 by implementing one or more instructions received from the management server 410, in one example. The management server 410 can send an instructions file, such as a user profile, which is stored at the user device 420. The user device 420 can then carry out the instructions by establishing a secure container 450. In some examples, portal application A 430 causes the OS of the user device 420 to establish the secure container 450. Applications within the container 450 can be prevented from communicating with other applications outside the container. Applications within the container 450 can also utilize a secure communication channel among other applications within the container 450 or with the management server 410.

In some examples, the management server 410 can detect that the container 450 has been created on the user device 420. The management server 410 can be configured to automatically push commands down to the user device 420 in response to detecting that the container 450 was created. The management server 410 can have a record of all managed applications on the device 420, such as by receiving state information from the portal application 430 or by receiving direct communications from the applications through a shared SDK upon which the applications can be built.

At stage 630, the portal application 430 can install a new instance of the portal application, referred to simply as a new portal application 455, inside the secure container 450. In some examples, this can include installing a fresh download of the new portal application 455. The new portal application 455 can be retrieved from an online application repository or from the management server 410, for example.

To configure the new portal application 455 for use, at stage 635 the new portal application 455 can retrieve state information saved for the old portal application 430. The saved state information can be stored at the storage location 425 of the user device 420, for example. In some examples, the old portal application 430 can instruct the new portal application 455 to retrieve the state information and apply any relevant configurations contained therein.

At stage 640, the new portal application 455 can restore the state saved from the old portal application 430 at stage 620. For example, the new portal application 455 can establish settings reflected in the state information, such as by setting a specific read/write location for the application to use, storing a list of applications for which the user has access, storing credentials associated with various applications that can be launched by the new portal application 455, and receiving a list of applications that need to be installed in the container 450 and configured using saved state information.

At stage 645, the new portal application 455 can download one or more applications to the secure container 450. The new portal application 455 can identify applications to download at this stage based on the state information received at stage 635. The state information can have a list of applications, such as email application A 435, web application A 440, and content application A 445. The list of applications can reflect applications that need to be migrated to the secure container 450 based on the migration command received at stage 610. The new portal application 455 can download new versions of those applications, such as email application B 460, web application B 465, and content application B 470.

At stage 650, the new portal application 455 can apply the states of the old applications 435, 440, 445 to the new applications 460, 465, 470. This can include, for example, changes to the operation, preferences, or settings of each respective application 460, 465, 470. In the case of email application B 460, for example, this can include setting up the application 460 to synchronize with a particular email server, downloading emails to be stored locally, storing a signature to be applied to outgoing emails, setting formatting preferences, and setting any other type of preferences available for email application B 460 that are carried over from email application A 435. Similar configurations can be applied to web application B 465 and content application B 470, and any other relevant applications.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for improved application rollback on a user device, comprising:
storing, by a portal application executing on the user device, state information for each of a plurality of applications managed by a management server, wherein the portal application provides a graphical user interface (GUI) with icons associated with the plurality of applications, and provides access to the plurality of applications based on user input selecting an icon associated with one of the plurality of applications, and wherein the state information for each of the plurality of applications includes a health status report hash;
sending the state information from the portal application to the management server;
receiving a rollback command at the portal application from the management server, the rollback command instructing the portal application to rollback a target application of the plurality of applications;
removing a first instance of the target application from the user device;
installing a second instance of the target application on the user device as specified by the rollback command; and
providing, by the portal application to the second instance of the target application, at least some of the state information from the first instance of the target application, wherein the target application uses the state information to implement at least one configuration.

2. The method of claim 1, wherein the state information further includes at least one of: an application version, a last backup time, a health status report, and a read/write location.

3. The method of claim 2, wherein the health status report comprises at least one of: an indication that a first application of the plurality of applications is syncing properly, an indication of network connectivity of the first application, a crash report for the first application, error logging, and an indication of whether the first application can receive notifications.

4. The method of claim 1, wherein the portal application and the target application each utilize a software development kit that allows for secure communication.

5. The method of claim 1, wherein the rollback command instructs the portal application to migrate itself from a location on the user device that is outside a secure container of the user device to inside the secure container.

6. The method of claim 5, wherein the portal application migrates by:
saving the state information to a storage location of the user device, wherein the state information includes state information for the portal application;
creating a secure work profile on the user device;
installing the portal application within the secure work profile; and
retrieving and applying the state information for the portal application.

7. The method of claim 5, wherein installing the second instance of the target application comprises installing the second instance within the secure container of the user device and applying the state information saved at a storage location of the user device.

8. A non-transitory, computer-readable medium containing instructions that, when executed by a hardware-based processor, performs stages for improved application rollback on a user device, the stages comprising:
storing, by a portal application executing on the user device, state information for each of a plurality of applications managed by a management server, wherein the portal application provides a graphical user interface (GUI) with icons associated with the plurality of applications, and provides access to the plurality of applications based on user input selecting an icon associated with one of the plurality of applications, and wherein the state information for each of the plurality of applications includes a health status report hash;
sending the state information from the portal application to the management server;
receiving a rollback command at the portal application from the management server, the rollback command instructing the portal application to rollback a target application of the plurality of applications;
removing a first instance of the target application from the user device;
installing a second instance of the target application on the user device as specified by the rollback command; and
providing, by the portal application to the second instance of the target application, at least some of the state information from the first instance of the target application, wherein the target application uses the state information to implement at least one configuration.

9. The non-transitory, computer-readable medium of claim 8, wherein the state information further includes at least one of: an application version, a last backup time, a health status report, and a read/write location.

10. The non-transitory, computer-readable medium of claim 9, wherein the health status report comprises at least one of: an indication that a first application of the plurality of applications is syncing properly, an indication of network connectivity of the first application, a crash report for the first application, error logging, and an indication of whether the first application can receive notifications.

11. The non-transitory, computer-readable medium of claim 8, wherein the portal application and the target application each utilize a software development kit that allows for secure communication.

12. The non-transitory, computer-readable medium of claim 8, wherein the rollback command instructs the portal application to migrate itself from a location on the user device that is outside a secure container of the user device to inside the secure container.

13. The non-transitory, computer-readable medium of claim 12, wherein the portal application migrates by:
saving the state information to a storage location of the user device, wherein the state information includes state information for the portal application;
creating a secure work profile on the user device;
installing the portal application within the secure work profile; and
retrieving and applying the state information for the portal application.

14. The non-transitory, computer-readable medium of claim 12, wherein installing the second instance of the target application comprises installing the second instance within the secure container of the user device and applying the state information saved at a storage location of the user device.

15. A system for improved application rollback on a user device, comprising:
a memory storage including a non-transitory, computer-readable medium comprising instructions; and
a hardware-based processor that executes the instructions to carry out stages comprising:
storing, by a portal application executing on the user device, state information for each of a plurality of applications managed by a management server, wherein the portal application provides a graphical user interface (GUI) with icons associated with the plurality of applications, and provides access to the plurality of applications based on user input selecting an icon associated with one of the plurality of applications, and wherein the state information for each of the plurality of applications includes a health status report hash;

sending the state information from the portal application to the management server;

receiving a rollback command at the portal application from the management server, the rollback command instructing the portal application to rollback a target application of the plurality of applications;

removing a first instance of the target application from the user device;

installing a second instance of the target application on the user device as specified by the rollback command; and providing, by the portal application to the second instance of the target application, at least some of the state information from the first instance of the target application, wherein the target application uses the state information to implement at least one configuration.

16. The system of claim 15, wherein the state information further includes at least one of: an application version, a last backup time, a health status report, and a read/write location.

17. The system of claim 16, wherein the health status report comprises at least one of: an indication that a first application of the plurality of applications is syncing properly, an indication of network connectivity of the first application, a crash report for the first application, error logging, and an indication of whether the first application can receive notifications.

18. The system of claim 15, wherein the portal application and the target application each utilize a software development kit that allows for secure communication.

19. The system of claim 15, wherein the rollback command instructs the portal application to migrate itself from a location on the user device that is outside a secure container of the user device to inside the secure container.

20. The system of claim 19, wherein the portal application migrates by:

saving the state information to a storage location of the user device, wherein the state information includes state information for the portal application;

creating a secure work profile on the user device;

installing the portal application within the secure work profile; and retrieving and applying the state information for the portal application.

* * * * *